D. P. ROBINSON, J. COYLE AND A. L. KRONQUEST.
SLITTER FEED.
APPLICATION FILED JULY 3, 1919.
1,395,207.
Patented Oct. 25, 1921.
7 SHEETS—SHEET 1.
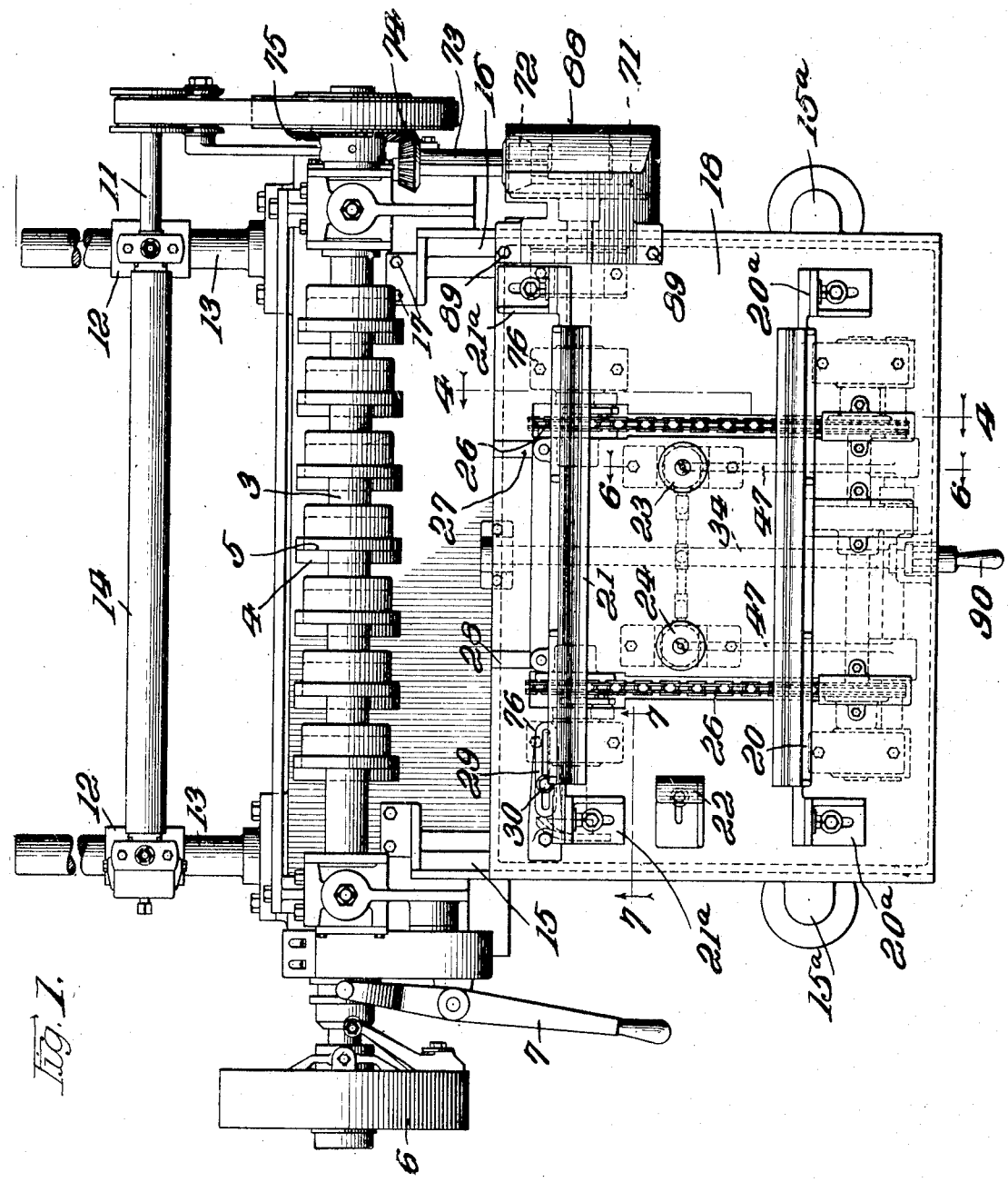

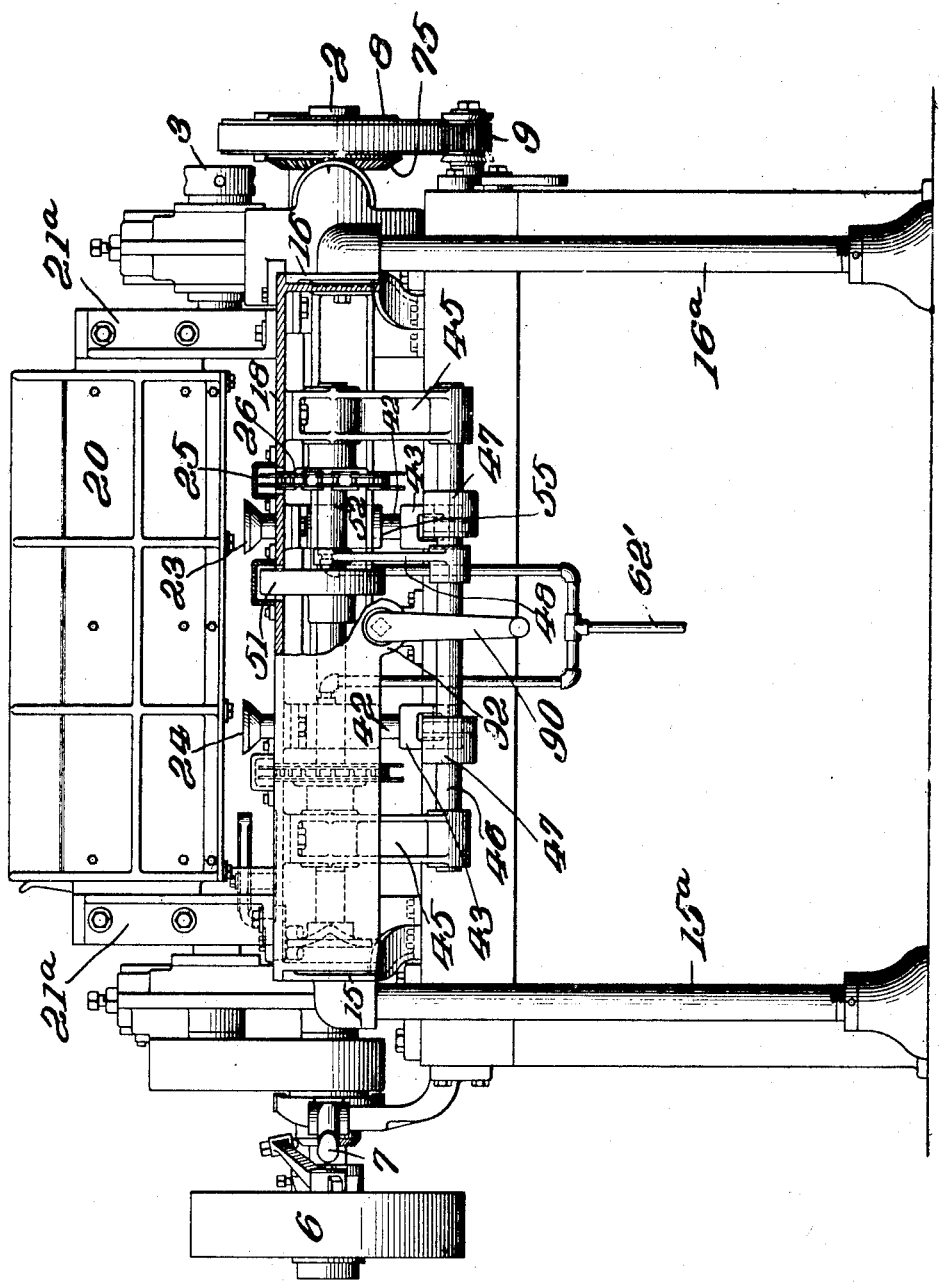

D. P. ROBINSON, J. COYLE AND A. L. KRONQUEST.
SLITTER FEED.
APPLICATION FILED JULY 3, 1919.
1,395,207.
Patented Oct. 25, 1921.
7 SHEETS—SHEET 3.
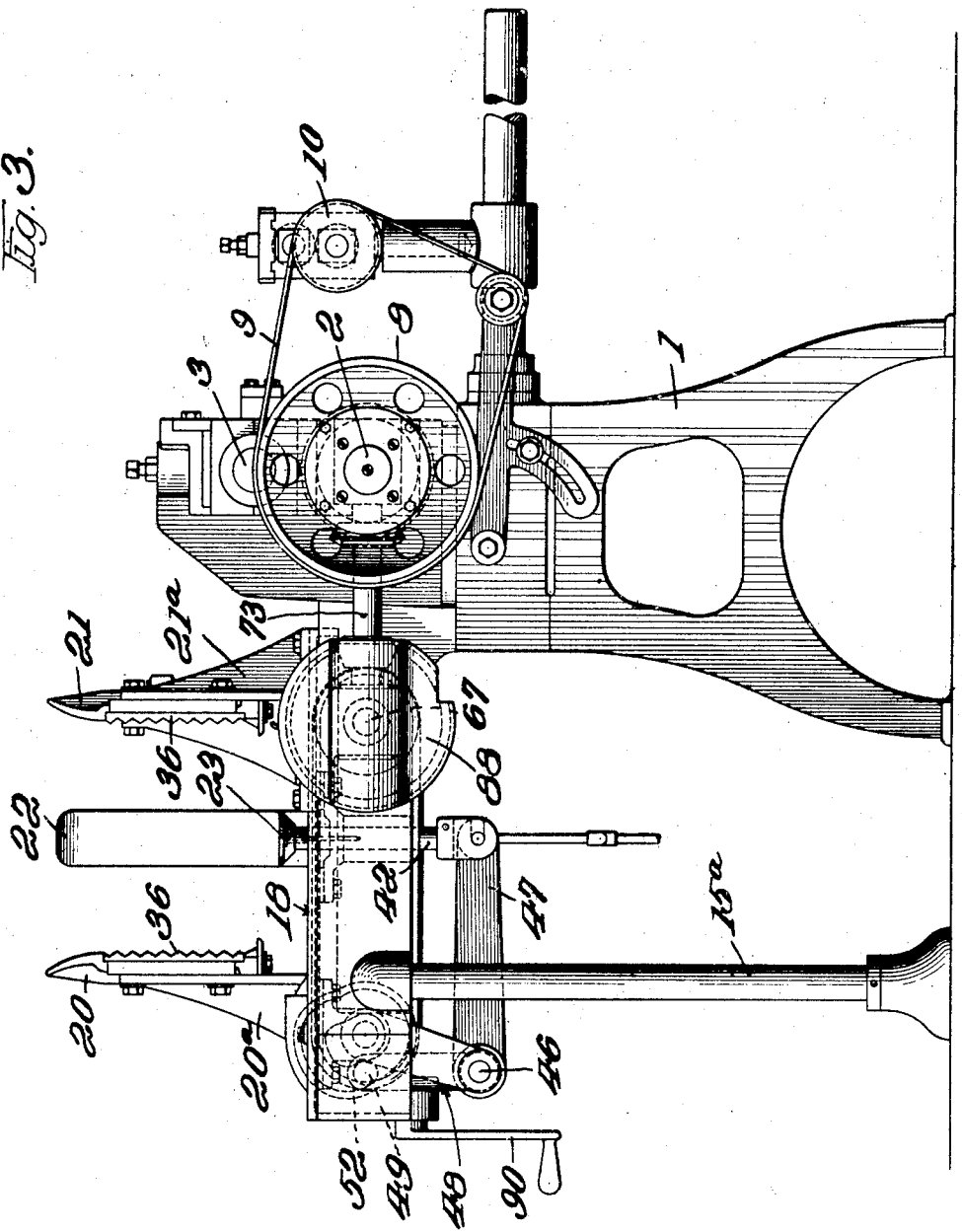

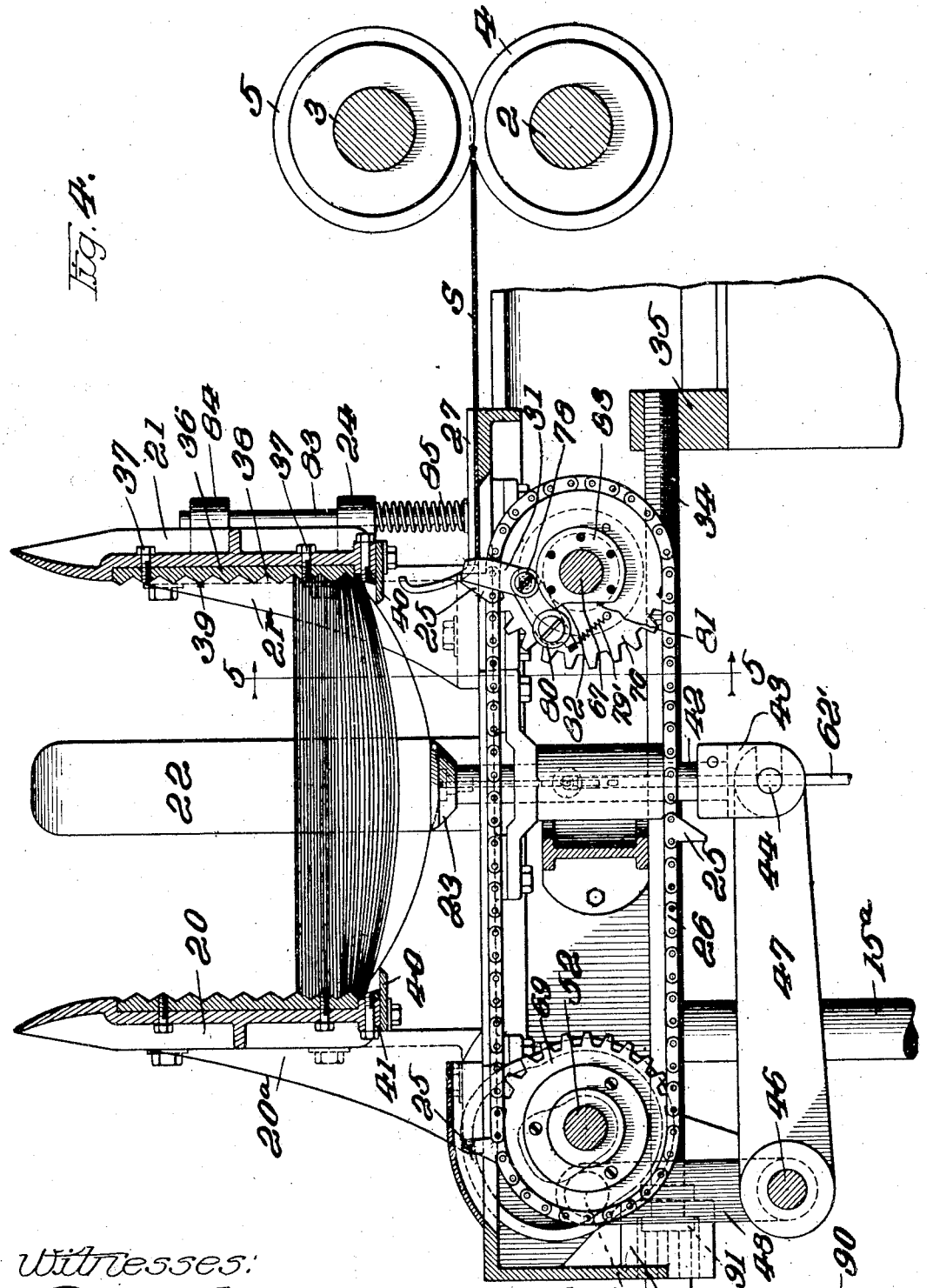

D. P. ROBINSON, J. COYLE AND A. L. KRONQUEST.
SLITTER FEED.
APPLICATION FILED JULY 3, 1919.
1,395,207.  Patented Oct. 25, 1921.
7 SHEETS—SHEET 5.
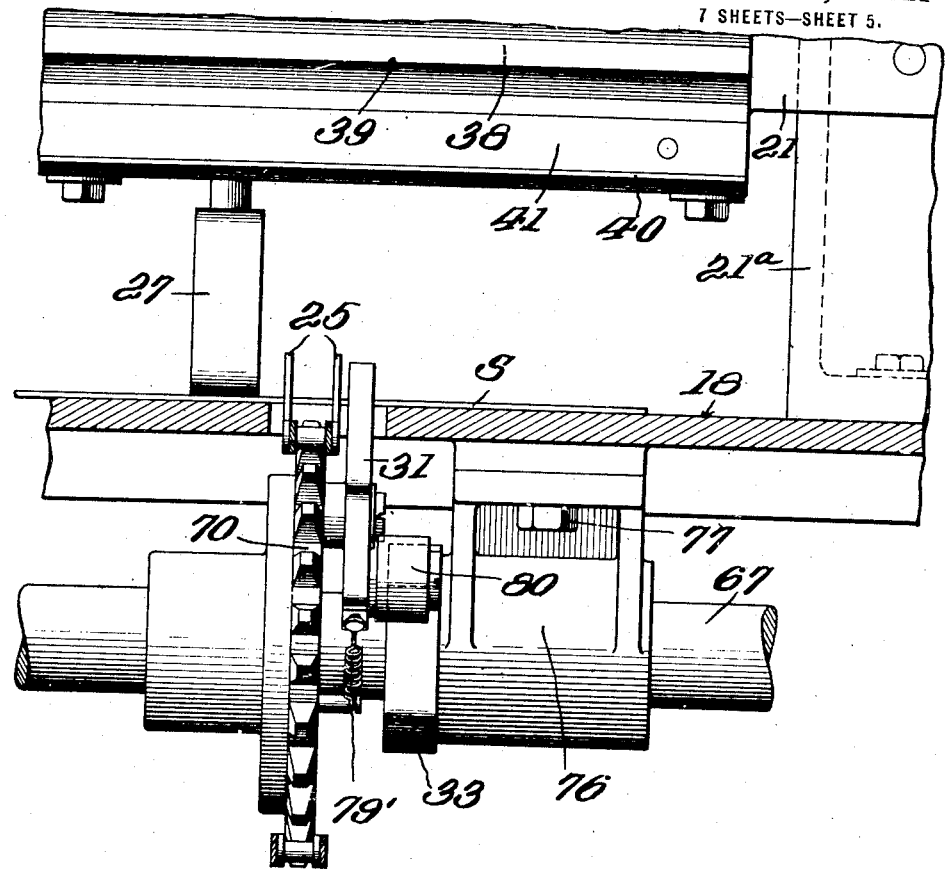
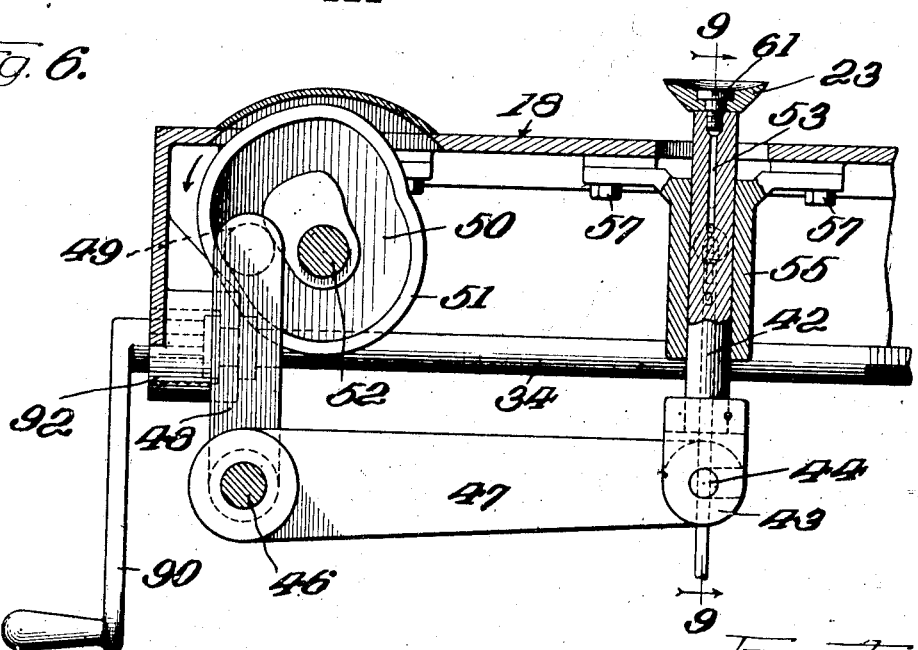

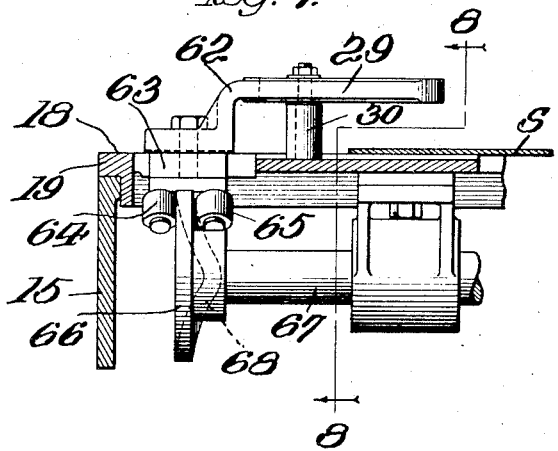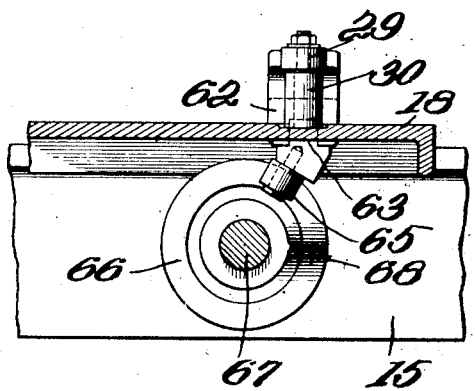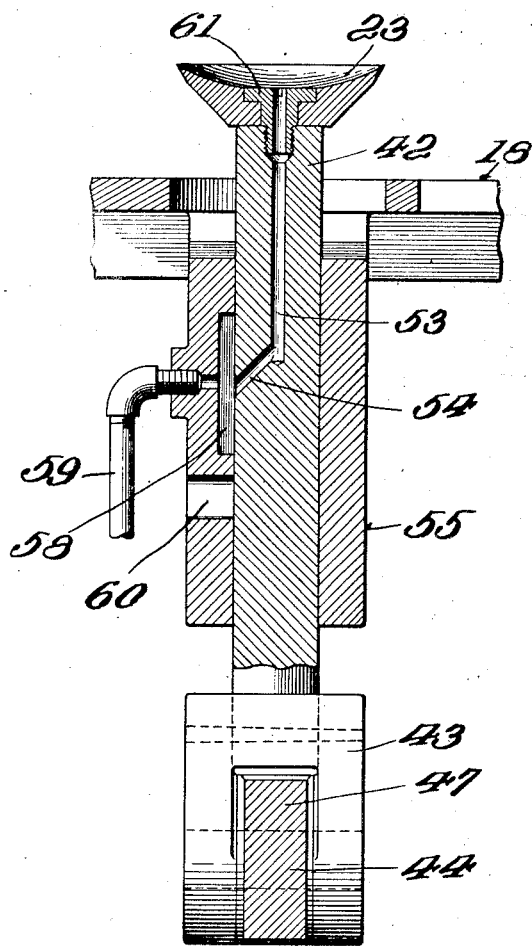

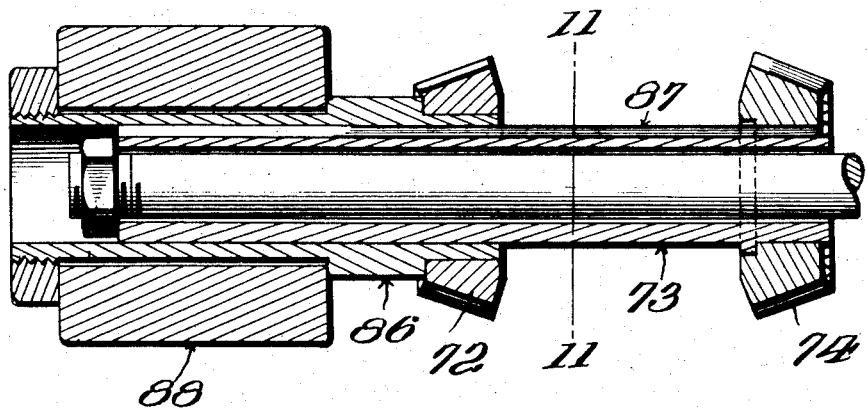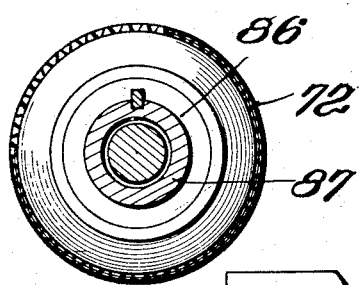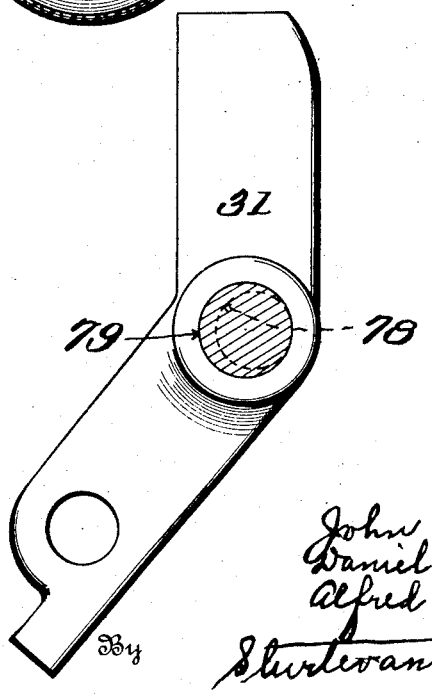

UNITED STATES PATENT OFFICE.

DANIEL P. ROBINSON AND JOHN COYLE, OF BALTIMORE, MARYLAND, AND ALFRED L. KRONQUEST, OF CHICAGO, ILLINOIS, ASSIGNORS TO CONTINENTAL CAN COMPANY INC., OF SYRACUSE, NEW YORK, A CORPORATION OF NEW YORK.

SLITTER-FEED.

1,395,207.

Specification of Letters Patent.   Patented Oct. 25, 1921.

Application filed July 3, 1919.   Serial No. 308,614.

*To all whom it may concern:*

Be it known that we, DANIEL P. ROBINSON, JOHN COYLE, and ALFRED L. KRONQUEST, citizens of the United States, residing, respectively, at Baltimore, Maryland, Baltimore, Maryland, and at Chicago, in the county of Cook, State of Illinois, have invented certain new and useful Improvements in Slitter-Feeds, of which the following is a description, reference being had to the accompanying drawing and to the figures of reference marked thereon.

The invention relates to new and useful improvements in a feeding mechanism for slitter machines, and more particularly to a machine which is adapted to slit or cut sheet tin plate.

An object of the invention is to provide a feeding mechanism for feeding the sheets to the slitter rolls, which feeding mechanism has a continuous movement as distinguished from a reciprocating feeding mechanism.

A further object of the invention is to provide a feeding mechanism for feeding sheets to slitter rolls, which feeding mechanism includes continuous moving devices for delivering the sheets to a point adjacent the bight of the slitter rolls and rectifying devices which are brought into operation to take the sheet from the sheet delivering devices and for squaring the sheet and presenting the same to the slitter rolls.

A further object of the invention is to provide a feeding mechanism for a slitter machine of the above character, wherein the sheets are fed from a magazine by reciprocating suckers which draw the sheet from the magazine and place the sheet so as to be engaged by the continuously moving delivering devices.

A further object of the invention is to provide a sheet feeding mechanism of the above character having rectifying devices with means whereby the timing of said rectifying devices may be independently adjusted.

A still further object of the invention is to provide a sheet feeding mechanism including a stack holder or magazine, devices for feeding the sheets one at a time from the stack or magazine on to a supporting table, devices for feeding the sheets forward into the slitter rolls, all of which devices are mounted upon supporting means which is capable of adjustment as a whole toward and from the slitter rolls for adjusting the feeding mechanism for sheets of different sizes.

These and other objects will in part be obvious and will in part be hereinafter more fully disclosed.

In the drawings which show by way of illustration, one embodiment of the invention—

Figure 1 is a plan view showing a slitter machine with the improvements applied thereto;

Fig. 2 is a view partly in front elevation and partly in section of the same;

Fig. 3 is a side view of the machine;

Fig. 4 is a sectional view on the line 4—4 of Fig. 1;

Fig. 5 is a sectional view on the line 5—5 of Fig. 4;

Fig. 6 is a sectional view on the line 6—6 of Fig. 1;

Fig. 7 is a sectional view on the line 7—7 of Fig. 1;

Fig. 8 is a sectional view on the line 8—8 of Fig. 7;

Fig. 9 is a sectional view on the line 9—9 of Fig. 6;

Fig. 10 is a sectional view lengthwise of the operating shaft;

Fig. 11 is a sectional view on the line 11—11 of Fig. 10.

Fig. 12 is an enlarged detail showing the eccentric mounting for the rectifying fingers.

The invention consists broadly in a feeding mechanism for a slitter machine—that is, a machine having a plurality of rotating cutting devices for sliding a sheet, and more particularly devices which are adapted to cut into sections tin plate.

In the forming of tin cans sheets of tin plate of standard size are trimmed and said sheets are then cut into sections of proper size to form the body of the cans. In order that these sections may be cut to advantage from the sheet and utilized in forming the bodies of the cans, the edges of the sections must be at right angles to each other and the sections accurately cut from the sheet of tin plate.

Prior to the present invention feeding devices have been employed which consisted of reciprocating pushers for sliding the sheet into the slitter rolls. Side gaging devices have also been used. It is found that when these devices are speeded up to maximum output that the reciprocating members striking against the edge of the plate, often fail to properly position the plate, resulting in the improper cutting of the sheet and forming cut sections which must be scrapped. This is due in part to the fact that the feeding in pusher reciprocates and moves into contact with the sheet at a very short interval of time prior to the entering of the sheet into the cutting rolls with more or less of a blow.

One of the objects of the present invention is to provide a sheet feeding mechanism, wherein the devices which feed the sheet into the cutting rolls travel continuously as distinguished from these reciprocating devices which move back and forth. In the present embodiment of the invention this continuous feeding mechanism includes traveling delivering lugs which engage the sheet and delivers the sheet one at a time and in succession at a point close to the bight of the slitter rolls where rectifying fingers traveling at a slightly greater speed than the lugs, come into engagement with the sheet and carry the sheet forward away from the lugs into the slitter rolls. These rectifying fingers are so set that they may be readily adjusted for varying the timing thereof, and said rectifying fingers, in addition to a body travel, are given an additional movement through cam means which enable said rectifying fingers to be operated with great exactness and the sheets of metal presented squarely to the slitter rolls, so that no waste whatever results. In addition to the feeding in mechanism there is also means for moving the sheet sidewise. The sheets are fed on to a table where they are engaged by the feeding in lugs from a magazine directly above the table, and the sheets are brought down one at a time by the suckers and positioned directly in front of the feeding in lugs. These feeding in lugs are preferably carried by endless chains which give to the lugs a continuous movement. The magazine for holding the sheets is constructed so that the sheets are drawn from the bottom thereof at a substantially uniform retarding friction. In other words, the force to pull a sheet from the magazine is substantially the same whether there are ten sheets or one hundred sheets in the magazine. This greatly increases the efficiency of the feeding mechanism as it insures that only one sheet at a time will be pulled from the magazine and placed on the feeding in table.

Another feature of the invention consists in the mounting of the magazine, the feeding in chains carrying the lugs, the rectifying fingers and all the operating devices therefor on a support which may be readily moved toward and from the slitter rolls for varying the capacity of the feeding in mechanism so that it may be readily adapted for sheets of different sizes.

Referring more in detail to the drawings, the invention is shown as applied to a slitter machine consisting of a supporting frame 1, in which is mounted a lower shaft 2 and an upper shaft 3. On the lower shaft 2 is a series of cutters or slitters 4, while on the upper shaft 3 is a series of cutters or slitters 5. The main shaft of the machine is operated by means of a suitable belt wheel 6 which may be clutched to or unclutched from the main shaft 2, by suitable clutching devices which are controlled by a hand lever 7. The lower shaft carries a gear which meshes with a gear on the upper shaft, so that the two shafts are positively driven. These parts are all of the usual construction in a slitter machine and further detail description thereof is not thought necessary.

Mounted on the end of the shaft 2 is a belt wheel 8 over which a belt 9 runs. This belt runs over a pulley 10 on a shaft 11 which is mounted in suitable bearings 12, carried by projecting arms 13, secured to the frame 1 of the slitter machine. The shaft 11 carries a roll 14 which assists in feeding the blanks or cut sections of the metal out of and away from the machine. Projecting forwardly from the frame 1 of the slitter machine are two spaced bracket arms 15 and 16. These bracket arms are secured to the frame by suitable bolts 17. Mounted to slide freely on these bracket arms is a table 18. Said table is provided with a ledge 19 at its upper portion which overlies and rests upon the bracket arms 15 and 16 see Fig. 7. Legs 15ª are secured to the outer ends of said arms 15 and 16.

Mounted on the feeding in table, and above the same, is a magazine or stack holder consisting of side plates 20 and 21 and an end standard 22. The side plate 20 is bolted to spaced brackets 20ª and the side plate 21 is bolted to spaced brackets 21ª. The sheets to be cut are placed in this magazine and are withdrawn therefrom one at a time by means of suckers 23 and 24. These suckers 23 and 24 are moved up and down so as to be brought first into engagement with the sheet and to pull the sheet from the stack. The sucker as it pulls the sheet from the stack places it on the feeding in table 18. Traveling across the feeding in table are delivering lugs 25. These delivering lugs are carried by chains 26 and serve to engage the sheet on the feeding in table and carry it forward to a position adjacent the bight of the cutting or slitting rolls. The sheet of metal passes underneath spring pressed plates 27 and 28. The sheet is moved sidewise so as to be properly positioned for delivery to the cutting or slitter rolls by means of a side gage 29, which side gage carries a roller 30 adapted to engage the side edge of the sheet and move it to proper position on the feeding in table. This side gage operates upon the sheet prior to its being moved forward to a position adjacent the slitter rolls. Coöperating with the feeding in lugs are rectifying fingers 31 and 32. These rectifying fingers are pivotally supported on the sprocket wheels which drive the chains and are given an independent movement by means of cams 33, one of which is associated with each rectifying finger. The rectifying fingers travel bodily with the sprocket wheels and through the cam action thereon, said rectifying finger engages the sheet at the rear edge thereof and moves the sheet forward into the bight of the slitting rolls. These rectifying fingers may be adjusted so as to engage the sheet and square the same up as it is delivered to the slitter rolls.

All the above devices and the operating means therefor are mounted on the feeding in table 18, so that said devices may be shifted bodily with the feeding in table. The feeding in table is adjusted back and forth on the supporting bracket arms therefor by means of a shaft 34 which is mounted in suitable bearings in the table, so as to be held from endwise movement therein and said shaft is threaded into a bracket 35, carried by the main frame 1 of the slitter machine. The turning of this shaft shifts the feeding in table and all the mechanism associated therewith for varying the capacity of the machine so as to feed sheets of different sizes.

The side plates 20 and 21 of the magazine are recessed to receive face plates 36 which are secured thereto by suitable bolts 37. Each face plate is formed with a series of V-shaped notches 38. These notches are formed so as to provide V-shaped projections 39. The V-shaped projection 39, in one face plate 36, is directly opposed to the V-shaped notch 38 in the other face plate, and as a result the sheets of metal which are supported in the magazine will be slid sidewise and thus bring the side edges of the sheet into position so as to rest on the inclined faces of first the notch 38, at one side of the magazine, and then the notch 38 at the other side of the magazine. In other words, when the sheets are in horizontal position a certain number of the sheets rest at one end on the lower inclined face of the notch 38 and at this time the opposite edges of the sheet are directly opposed to the upper inclined faces of the notches 38. As the sheets are drawn from beneath the same the sheets will follow down these notched plates, but the weight of the sheets will be carried largely by the inclined faces of the plates 36, so that the weight of the sheets at the lower part of the stack, or rather the force against the sheets at the lower part of the stack, due to the weight of the stack of sheets, will be substantially uniform. This is because the weight on the lower sheet is substantially only that of the lowermost sheets, while the sheets above the same are supported in a large measure by these inclined faces. At the extreme lower edge of the side plates 20 and 21 are supporting fingers 40 and just above these fingers 40 are similarly disposed inclined plates 41, the distance between which is slightly less than the width of a sheet. As a result the suckers pull the sheets down against the inclined plates 41 and thence against the fingers 40 and the sheet bends to allow the side edges to pass said fingers. This bending of the sheet through the action of the suckers thereon, insures that only one sheet will be drawn from the stack at a time.

A great deal of trouble has been experienced in the drawing of sheets from a magazine, owing to the fact that the lowermost sheet clings to the sheet above, due, partly, to the atmospheric pressure. The bending of the sheet sharply, as indicated in the drawings, tends to permit the air to get between the sheets and break up the clinging of the lower sheet to the sheet next above. As a further means for insuring the pulling of one sheet only from the magazine, the means for operating the suckers has been timed so that said suckers move down very slowly and then rise quickly into position to engage the next sheet. This slow movement of the suckers, pulling the sheet downwardly, permits the air to get in between the lowermost sheet and the next sheet above, and break up this clinging action referred to and greatly aids in the delivering of one sheet only from the magazine on to the feeding in table.

The suckers 23 and 24 are carried respectively by vertical rods 42, which reciprocate in suitable bearings carried by the feeding in table. These rods are each provided with a head 43 at their lower ends, carrying a pin 44. Journaled in suitable brackets 45 on the under-face of the table 18, is a shaft 46. Extending forwardly from the shaft 46 are two spaced arms 47 and these arms are connected, respectively, to the rods which carry the suckers 23 and 24. The arm 47 has a slotted end which engages the pin 44. The shaft 46 carries an upwardly extending arm 48, which is provided with a roller 49 running in a cam groove 50, formed in a disk 51, which in turn is mounted on a shaft 52, likewise journaled in suitable bearings carried by the brackets 45. This cam groove 50 is so shaped that when the disk rotates in the direction of the arrow, Fig. 6, the suckers will be lowered comparatively slowly and will be raised comparatively quickly. The supporting rod 42 for the sucker is formed with a vertical air passage 53. Extending at an inclined direction through the rod 42 and joining the air passage 53 is a passage 54. The supporting bearing for the rod 42 is in the form of a depending sleeve, indicated at 55 in the drawings. Said sleeve is secured to the underface of the table 18 by bolts 57. Of course, it will be understood that there is a separate sleeve for each rod 42. Said sleeve is formed with a chamber 58, with which a suction pipe 59 is connected. Also, formed in said sleeve is an opening 60. The sucker 23 is connected to the rod 42 by means of a screw 61 and there is a central opening through said screw 61 connecting the passage 53. When the parts are in the position shown in Fig. 9, the passage 53 is connected with the chamber 58 and the chamber 58 is connected with the pipe 59, which in turn is connected with the pipe 62' leading to a suitable source of suction producing means, and therefore the suction cup 23 when brought into contact with the sheet will at once firmly grip the same so that the downward movement of the rod 42 will draw the sheet down, as indicated in Fig. 4 of the drawings. When, however, the passage 54 comes into register with the opening 60, then the suction grip of the sucker 23 is broken and the sheet will be released. The same is true of the suction cup 24. These suction cups move into suitable recesses in the table and release the sheet when it is flat on the feeding in table.

The sheet is moved sidewise of the machine for properly positioning the sheet by means of the roller 30 of the side gage 29. Said side gage is in the form of an arm 62, which is bolted to a sliding cross-head 63 mounted to slide in a guideway in the table 18, see Fig. 7. Said cross head is provided with two spaced rollers 64 and 65, which are adapted to engage the opposite sides of a disk 66 carried by the shaft 67. The said disk is shaped so as to form a cam 68, and this cam 68 running between the rollers 64 and 65, moves the cross head 63 transversely of the feeding in table and this brings the roller 30 into contact with the sheet, indicated at S in the drawings, and this slides the sheet so as to position the same for forward movement into the slitter rolls. The arm 62 is slotted and the roller 30 is adjustably connected to this slotted arm so that it may be shifted toward or from the end of the arm and thus position it for properly placing the sheet.

The feeding in lugs 25 are carried by the sprocket chains 26, as above noted. The sprocket chains 26 run over sprocket wheels 69 mounted on the shaft 49 and sprocket wheels 70 mounted on the shaft 67. It is understood, of course, that there is a pair of sprocket wheels for each chain. As shown in the drawings, each chain is provided with three lugs 25, which come into operation, one after the other.

The suckers are so timed as to withdraw a sheet from the magazine and place the same on the feeding table just in advance of a pair of feeding in lugs. As soon as the sheet is released from the suckers, these feeding in lugs engage the edge of the sheet and move it forward to a position adjacent the bight of the slitter rolls. It will be noted that these feeding in lugs move continuously in a forward direction when in operative position for engaging the sheet. The shaft 67 is rotated continuously by means of a beveled gear 71, which meshes with a beveled gear 72 carried by a shaft 73, and the shaft 73 carries a beveled gear 74 which meshes with a beveled gear 75 carried by the shaft 2. The shaft 2 rotates continuously and this imparts through the train of mechanism specified, a continuous rotation to the shaft 67 and the shaft 67 moves the sprocket chain continuously and through the sprocket wheels 69 rotates the shaft 49 continuously. The shaft 67 is mounted in suitable bearings 76 secured to the underface of the table 18 by suitable bolts 77.

The rectifying finger 31 is pivoted at 78 to the sprocket wheel 70. There is a rectifying finger for each sprocket wheel 70. The pivotal support 78 is in the form of a pin having an eccentric portion 79. The purpose of this eccentric portion is to permit the shifting of the fulcrum of the rectifying finger, so as to adjust the timing of one finger relative to the other and also adjust the timing of the rectifying fingers relative to the feeding in lugs 25. Each rectifying finger is swung about its pivotal support in one direction by a spring 79' and in the opposite direction by the roll 80 which bears against the fixed cam 33. The cam 33 is secured to the bearing 76 for the shaft 67, see Fig. 5.

From the above, it will be apparent that these rectifying fingers travel bodily with the sprocket wheels on which they are mounted and the roller 80 runs on the fixed cam 33. The cam 33 is concentric throughout a greater portion of its extent and formed with a cut away portion 81 which extends abruptly outwardly to the concentric portion of the cam, as indicated at 82. The result of this shaping of the cam is, as follows: As the sprocket wheel rotates when the roller reaches the cut away portion the spring will move the rectifying finger rearwardly until its front edge is substantially in rear of the lug 25 on the sprocket chain and thus said finger will come up in rear of the sheet which is to be fed forward by the rectifying fingers. Just before the lug 25 reaches the position where it will begin to move downwardly and beneath the surface of the table, the roller 80 reaches the inclined portion 82 and is forced outwardly. This forces the upper end of the rectifying finger forwardly and carries the sheet away from the lug 25 and feeds said sheet into the slitter rolls. This movement of the rectifying fingers is slightly more rapid than the movement of the feeding in lugs and thus the sheet is carried away from the lugs so that the lugs may tilt to follow the curve of the sprocket wheel and thence down underneath the feeding in bed without again striking the sheet. The timing of the rectifying fingers may be varied as above noted, by shifting the eccentric pivot pins therefor and said rectifying fingers may be positioned and timed so as to pick up the sheet just at the right moment, squaring the sheet and feeding it forward into the bight of the slitter rolls.

The lugs 25, as herein shown, are formed as a part of the sprocket chains, and are in fact, in pairs. The sheet as it is fed forward by the lugs 25 passes underneath the friction grip plates 27. Each plate 27 is carried by a rod 83 which is mounted to move in suitable bearing lugs 84 carried by the side plate 21. A spring 85 normally forces this plate 27 downwardly into contact with the sheet. The plate 28 is similarly mounted and forced downwardly into contact with the sheet. These spring plates put sufficient drag on the sheet which is being fed forward so as to prevent any overthrow thereof in its sidewise or endwise movements.

The shaft 73 is formed of two sleeve sections 86 and 87. The section 86 carries the gear 72 and this shaft extends into a bearing carried by the gear housing 88, which in turn is fixed to the feed table by suitable bolts 89. As the feed table is moved toward and from the slitter rolls this gear housing will move therewith and will cause the section 86 to slide endwise on the section 87 of the shaft. The section 87 of the shaft carries the gear wheel 74 and this gear wheel is mounted in suitable bearings carried by the frame of the slitter machine. This causes the gear 74 to remain in mesh with the gear 75 when the section 86 and bearing 88 are moved in adjusting the position of the feeders. The two sections 86 and 87 of the shaft are secured together by suitable spline or key, so that they rotate together. The purpose of this sectional shaft is to permit the feeding in table 18 and all the parts supported thereby to be moved back and forth on the supporting bracket arms 15 therefor. The shaft 34 which is used for moving the table toward and from the slitter rolls may be operated by a crank 90 and said shaft has spaced collars 91 which straddle projections formed as a part of the bearing 92, and this bearing is connected to the table so that endwise movements of the shaft will move the table 18 toward and from the slitter rolls.

From the above it will be apparent that we have provided a feeding mechanism for a slitter machine, wherein the sheet is fed forward to the slitter rolls by continuously traveling devices as distinguished from reciprocating devices and the sheet is actually delivered to the slitter rolls by rectifying fingers which may be readily timed so as to square the sheet and insure its proper delivery to the slitter rolls. The entire mechanism is also mounted on a feeding in table which may be readily adjusted to vary the capacity of the machine. The magazine for supporting the sheets is so constructed that sheets may be fed one at a time therefrom regardless of the number of sheets in the stack, as the weight of the stacked sheets is so distributed and supported that frictional grip on the sheets is substantially uniform. This magazine construction may be used in connection with other feeding devices and *per se* forms no part of the present invention, but is shown and described in the co-pending application, Serial No. 308,474, filed of even date herewith by Alfred L. Kronquest, as sole inventor.

It will be apparent that the machine may be operated by unskilled labor as all the operator is required to do is to keep the magazine filled with blanks and the machines squares the blanks relative to the slitter rolls and feeds the same thereto. This does away with all expert labor which has heretofore been required in order to feed these machines by hand with sufficient speed to obtain a commercial output.

While we have shown and described the feeding mechanism as applied to slitter rolls, it will be obvious, of course, that the feeding mechanism may be used in conjunction with any machine operating upon blanks. Furthermore, it will be obvious that instead of using the machine for feeding metal blanks, it may be used for feeding blanks of any kind, such as card-board, or the like.

It is obvious that minor changes in the details of construction and the arrangement of parts may be made without departing from the spirit of the invention as set forth in the appended claims.

Having thus described the invention, what we claim as new and desire to secure by Letters Patents, is:

1. A feeding mechanism for slitter machines including in combination, a support for the sheets, continuously moving devices for delivering the sheets to a point closely adjacent the slitter rolls, rectifying devices, supports traveling in timing with the delivering devices on which said rectifying devices are mounted, and means for moving the rectifying devices on their supports for engaging and moving the sheet forward into the slitter rolls.

2. A feeding mechanism for slitter machines including in combination, a support for the sheets, continuously moving devices for delivering the sheets to a point closely adjacent the slitter rolls, rectifying devices, supports traveling in timing with the delivering devices on which said rectifying devices are mounted, means for moving the rectifying devices on their supports for engaging and moving the sheet forward into the slitter rolls, and means whereby the timing of the rectifying devices may be independently adjusted.

3. A feeding mechanism for slitter machines including in combination a supporting table, continuously traveling devices for moving the sheets forward on the table to a point adjacent the slitter rolls, rectifying devices, supports for the rectifying devices traveling in timing with the delivering devices, and means for moving said rectifying devices on their supports for causing the same to engage the sheets and move the same away from the delivering devices and into the sliter rolls.

4. A feeding mechanism for slitter machines including in combination a supporting table, continuously traveling devices for moving the sheets forward on the table to a point adjacent the slitter rolls, rectifying devices, supports for the rectifying devices traveling in timing with the delivering devices, and means for moving said rectifying devices on their supports for causing the same to engage the sheets and move the same away from the delivering devices and into the slitter rolls, and means for independently adjusting the rectifying devices.

5. A feeding mechanism for a slitter machine including in combination a supporting table, traveling chains having lugs for engaging the sheet on the table by moving the same forward to a point adjacent the slitter rolls, rectifying devices traveling bodily in timing with said chains, and means for engaging said rectifying devices for moving the same during their bodily travel into engagement with the sheet for moving the sheet away from the traveling lugs and into the slitter rolls.

6. A feeding mechanism for a slitter machine including in combination a supporting table, traveling chains having lugs for engaging the sheet on the table by moving the same forward to a point adjacent the slitter rolls, rectifying devices traveling bodily in timing with said chains, means for engaging said rectifying devices for moving the same during their bodily travel into engagement with the sheet for moving the sheet away from the traveling lugs and into the slitter rolls, and means whereby the timing of the rectifying devices may be independently adjusted.

7. A feeding mechanism for slitter machines including in combination a supporting table, shafts parallel with the slitter rolls, sprocket wheels mounted thereon, sprocket chains running over said sprocket wheels and having spaced lugs for moving the sheets forward to a point adjacent the slitter rolls, rectifying devices movable in timing with the sprocket wheels, and devices coöperating with said rectifying devices for moving the same during their bodily travel into engagement with the sheet for moving the sheet away from the lugs and into the slitter rolls.

8. A feeding mechanism for slitter machines including in combination a supporting table, shafts parallel with the slitter rolls, sprocket wheels mounted thereon, sprocket chains running over said sprocket wheels and having spaced lugs for moving the sheets forward to a point adjacent the slitter rolls, rectifying devices movable in timing with the sprocket wheels, devices coöperating with said rectifying devices for moving the same during their bodily travel into engagement with the sheet for moving the sheet away from the lugs and into the slitter rolls, and movable side gaging means operated by one of said shafts for positioning the sheet transversely relative to the sprocket chains.

9. A feeding mechanism for slitter machines including in combination, supporting bracket arms carried by the machine, a supporting table mounted on said arms and adjustable toward and from said machine, a magazine carried by said table in which the sheets are stored, mechanisms carried by the table for feeding the sheets one at a time from said magazine and to said slitter rolls, and actuating devices connecting said mechanisms with the main shaft of the machine, said actuating devices being constructed so as to permit the table to be adjusted without disturbing the actuating connections.

10. A feeding mechanism for slitter machines including in combination, supporting bracket arms carried by the machine, a supporting table mounted on said arms and adjustable toward and from said machine, a magazine carried by said table in which the sheets are stored, mechanisms carried by the table for feeding the sheets one at a time from said magazine and to said slitter rolls, actuating devices connecting said mechanisms with the main shaft of the machine, said actuating devices being constructed so as to permit the table to be adjusted without disturbing the actuating connections, a hand operated shaft having a threaded connection with the frame of the slitter machine, and a connection with said table, whereby said table may be positively adjusted by the rotating of the said hand shaft.

11. A feeding mechanism for a slitting machine including in combination, supporting bracket arms, a table adjustably mounted thereon, shafts mounted in bearings carried by said table, sprocket wheels on said shaft, sprocket chains running over said sprocket wheels, lugs carried by said chains for feeding the sheets one at a time to a point adjacent the slitter rolls, rectifying fingers carried by one of said shafts for engaging the sheets and moving the same away from said lugs into the slitter rolls, a side gage operated by one of said shafts, for moving the sheets laterally to position the same relative to the lugs, and actuating means for driving the shaft from the main shaft of the slitter machine, said actuating means including telescoping shaft sections which permits the table to be adjusted without disturbing said actuating connections.

12. A feeding mechanism for a slitting machine including in combination, supporting bracket arms, a table adjustably mounted thereon, shafts mounted in bearings carried by said table, sprocket wheels on said shafts, sprocket chains running over said sprocket wheels, lugs carried by said chains for feeding the sheets one at a time to a point adjacent the slitter rolls, rectifying fingers carried by one of said shafts for engaging the sheets and moving the same away from said lugs into the slitter rolls, a side gage operated by one of said shafts for moving the sheets laterally to position the same relative to the lugs, actuating means for driving the shaft from the main shaft of the slitter machine, said actuating means including telescoping shaft sections which permits the table to be adjusted without disturbing said actuating connections, and a hand shaft threaded into the frame of the machine and having connection with the said table, whereby the turning of the shaft will move the table toward and from the slitter machine.

13. A feeding mechanism for a slitter machine including in combination, means for delivering the sheets to a point adjacent the slitter rolls, rectifying fingers for moving the sheets into the slitter rolls, means for supporting said rectifying fingers, whereby the same are given a bodily travel, said means for supporting said rectifying fingers including devices whereby said fingers may be shifted relative to the traveling means therefor for varying the timing of the rectifying fingers.

14. A feeding mechanism for slitter machines including in combination, devices for moving the sheets forward to a point adjacent the slitter rolls, pivoted rectifying fingers for engaging the sheets and moving the same into the slitter rolls, rotating supporting devices for said rectifying fingers, and stationary cams for swinging the rectifying fingers on their pivots.

15. A feeding mechanism for slitter machines including in combination, devices for moving the sheets forward to a point adjacent the slitter rolls, pivoted rectifying fingers for engaging the sheets and moving the same into the slitter rolls, rotating supporting devices for said rectifying fingers, stationary cams for swinging the rectifying fingers on their pivots, and means for adjusting the pivotal supports of the fingers for varying the timing of the same.

16. A feeding mechanism for slitter machines including in combination, traveling chains, lugs carried by said chains for feeding the sheets forward to a point adjacent the slitter rolls, pivoted rectifying fingers movable bodily in timing with said chains, and stationary cams for swinging the rectifying fingers on their pivots for causing the said rectifying fingers to move the sheets away from the lugs and into the slitter rolls.

17. A feeding mechanism for slitter machines including in combination, a supporting table on which the sheets are placed one at a time, spring pressed friction plates underneath which the sheet passes for placing drag thereon, means for feeding the sheet forward to a point adjacent the slitter rolls, means for engaging the sheet and moving the same laterally for side gaging the sheet, and rectifying devices for engaging the sheet and moving the same away from the feeding means and into the slitter rolls.

In testimony whereof, we affix our signatures.

DANIEL P. ROBINSON.
JOHN COYLE.
ALFRED L. KRONQUEST.